No. 674,773. Patented May 21, 1901.
F. D. JUSTO.
SETTING APPARATUS FOR ANIMAL TRAPS.
(Application filed Mar. 23, 1901.)
(No Model.)
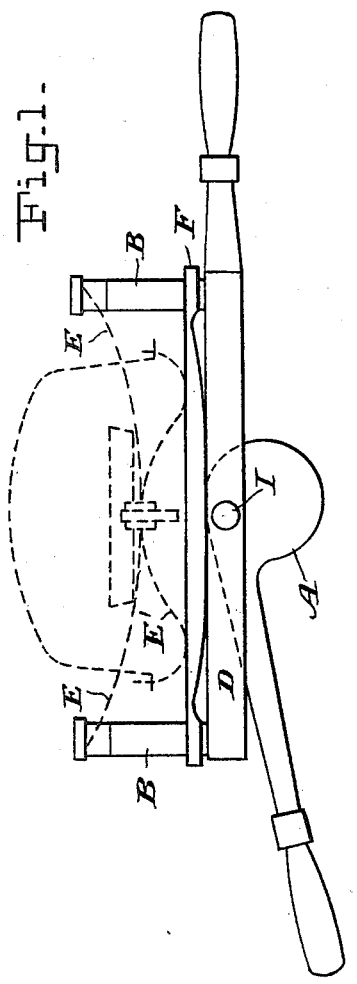
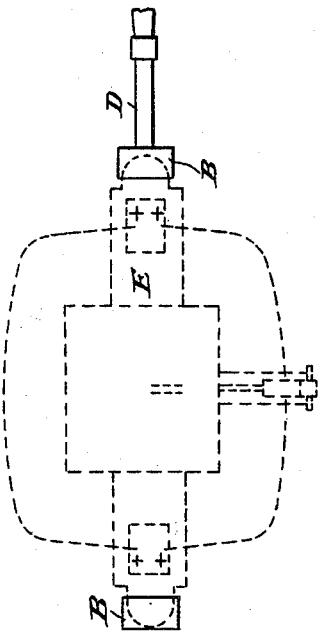
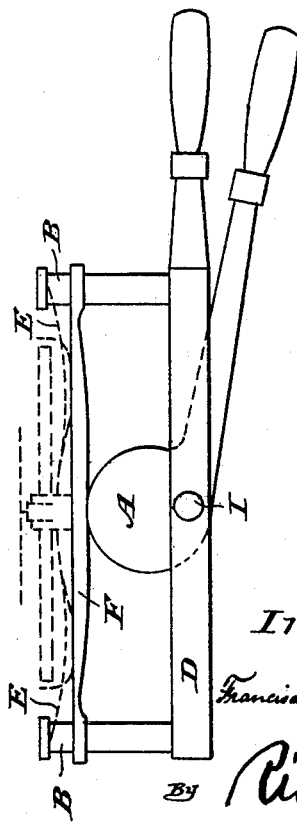
Witnesses:
E. B. Bolton
Ella L. Giles
Inventor:
Francisco Domingo Justo
By Richards & Co.
his Attorneys.

UNITED STATES PATENT OFFICE.

FRANCISCO DOMINGO JUSTO, OF BUENOS AYRES, ARGENTINA.

SETTING APPARATUS FOR ANIMAL-TRAPS.

SPECIFICATION forming part of Letters Patent No. 674,773, dated May 21, 1901.

Application filed March 23, 1901. Serial No. 52,539. (No model.)

*To all whom it may concern:*

Be it known that I, FRANCISCO DOMINGO JUSTO, a citizen of Argentina, residing at No. 745 Calle Tucuman, in the city of Buenos Ayres, Argentina, have invented certain new and useful Improvements in Setting Apparatus for Animal-Traps; and I do hereby declare the following to be a full, clear, and exact description of the invention, such as will enable others skilled in the art to which it appertains to make and use the same.

The present invention refers to a device or apparatus for setting the spring-traps used for catching fur-bearing or other animals. The traps which are generally employed for this purpose are those which are formed by two jaws, toothed or otherwise, which jaws are acted upon by two oppositely-curved springs, of which the force is exercised in such a direction as to maintain said jaws normally closed. Formerly in order to set these traps it was necessary to place them on the ground and press the ends of the springs downward with both feet, remaining at the same time in a stooping posture in order to secure the end of the trip or trigger in its notch, besides which there was always danger of the springs escaping from under the feet during the setting process, thus springing the trap violently and injuring the hands of the operator. With the apparatus herein described all these inconveniences and dangers are avoided and the traps of this system can be set with the greatest of rapidity and safety.

In the accompanying drawings there is shown for the better explanation of this invention an apparatus of this system, in which drawings like letters of reference indicate like parts in all the figures.

In said drawings, Figure 1 is a side view of the apparatus in which the trap in its sprung position is shown by dotted lines. Fig. 2 is a side view of the same apparatus after setting the trap, and Fig. 3 is a plan of the same with the trap set.

As will be seen, the setting apparatus consists, essentially, of two parallel metal bars D, provided at one end with a handle. At both ends there are fastened two small uprights B, with their upper ends bent in form of a hook. These uprights B serve as guides for a bar F, horizontally placed and capable of an upward movement limited by the height of said uprights. Between said bars D the lever A moves upon its pivot I. This lever is enlarged at its upper end in a semicircular or pear-shaped form and at the other end in the form of a handle. As this lever is swung upon its pivot I the enlarged end rises and lifts the movable bar F.

To set the trap, proceed as follows: The apparatus being in the position indicated in Fig. 1, place the ends of the spring E of the trap under the hooks of the uprights B and holding the handle of the bars D with one hand and the lever A with the other swing the latter until it reaches the position shown in Fig. 3. The enlarged pear-shaped end lifts the bar F, which in its ascent exercises pressure on the springs E' and E of the trap, causing them to assume a position parallel to that of the bar F, thereby permitting the jaws to be opened and the trigger to be set, as may be seen in Fig. 3. As soon as the trigger is secured swing the lever A in an opposite direction and take the trap out of the setting apparatus.

Having thus particularly described and ascertained the nature of my invention and in what manner the same is to be performed, that which I claim as new, and desire to secure by Letters Patent, is—

An apparatus for setting traps used for catching fur-bearing or other animals, which apparatus consists essentially of a frame formed by two parallel bars provided at both ends with two uprights or vertical bars, the upper ends of which uprights are bent in hook form, said uprights serving as guides for a horizontal bar which is movable vertically up to the limit of the height of said uprights and which is acted upon by a pear-shaped or semicircular enlargement of a lever swung on a pivot situated in the space between said parallel bars of the frame, whereby the enlarged end of said lever, on being lifted, will push the said movable bar upward thus causing the springs of the trap to take a horizontal position which permits the jaws of the same to be opened and the trigger to be set, essentially as herein described and for the purposes indicated.

In witness whereof I have hereunto affixed my signature in presence of two witnesses.

FRANCISCO DOMINGO JUSTO.

Witnesses:
 PEDRO ALBERTO BREUER,
 G. M. BREUER.